United States Patent [19]

Rzeszewski et al.

[11] Patent Number: 5,917,481
[45] Date of Patent: Jun. 29, 1999

[54] ELECTRONIC TELEVISION PROGRAM GUIDE WITH SELECTIVE UPDATING

[75] Inventors: Theodore S. Rzeszewski, Lombard; Tobin L. Gimber, Montgomery, both of Ill.

[73] Assignee: Matsushita Electric Corporation of America, Franklin Park, Ill.

[21] Appl. No.: 08/990,796

[22] Filed: Dec. 15, 1997

Related U.S. Application Data

[63] Continuation of application No. 08/415,181, Mar. 31, 1995, Pat. No. 5,699,125.

[51] Int. Cl.$^6$ ........................................................ H04N 7/10
[52] U.S. Cl. ............................ 345/327; 348/906; 348/569
[58] Field of Search ............................ 345/327; 348/210, 348/12, 906, 553, 563, 564, 565, 566, 567, 568, 569, 570; 455/3.1; H04N 7/10

[56] References Cited

U.S. PATENT DOCUMENTS

| | | | |
|---|---|---|---|
| 5,592,551 | 1/1997 | Lett et al. .............................. | 348/7 X |
| 5,652,613 | 7/1997 | Lazarus et al. ......................... | 348/7 X |
| 5,790,198 | 8/1998 | Roop et al. ........................... | 348/906 X |

*Primary Examiner*—Nathan Flynn
*Attorney, Agent, or Firm*—McDermott, Will & Emery

[57] ABSTRACT

A method and device for receiving and storing an electronic television (TV) program guide. In a satellite, cable or broadcast TV system, electronic TV program guides may be coded into the video signals received by the TV receiver. Many currently available TV receivers also allow users to program a list of "select-channels." When the receiver is in its select-channel mode, the receiver only tunes to the channels the user stored in the list of select channels. The present invention limits the memory and processing power required to store an electronic TV program guide by only storing program guide information associated with the channels stored by the user in connection with the select-channels function of the receiver. In receivers having a second tuner, the second tuner may be used to automatically update the stored program guide.

20 Claims, 4 Drawing Sheets

5,917,481

ELECTRONIC TELEVISION PROGRAM GUIDE WITH SELECTIVE UPDATING

This is a continuation of Ser. No. 415,181 filed Mar. 31, 1995 now U.S.A. Pat. No. 5,699,125.

BACKGROUND OF THE INVENTION

This invention relates in general to electronic program guides for television (TV) receivers. More particularly, the present invention relates to a specially designed electronic TV program guide having improved flexibility, versatility, and cost savings over known electronic TV program guides.

A typical electronic TV program guide is a database of programming information encoded into the video signals broadcast over a satellite, cable or broadcast TV system. The database is decoded from the received video signals, then stored in the satellite receiver, cable TV decoder, the TV receiver itself, or other similar such unit. The electronic program guide information may be viewed and/or searched by displaying the guide on the TV screen upon demand. In comparison with printed TV program guides, electronic guides offer larger capacity, electronic searching, last-minute updates, and other features that are not practical with printed paper guides.

However, because of the large number of stations available on satellite and cable TV systems, the memory and processing requirements for electronically storing and searching through the potentially enormous amounts of program information available for satellite and cable services can prohibit a cost-effective and simple implementation of an electronic TV program guide. Others have attempted to reduce the memory and processing burdens associated with electronic TV program guides. For example, U.S. Pat. No. 5,038,211 issued to Hallenbeck discloses an online TV program information system that stores from a broadcast datastream only program information that meets selection criteria determined by the user. However, the Hallenbeck system calls for the user to program several potentially long and involved selection criteria. As illustrated in FIG. 1 of the Hallenbeck patent, the selection criteria 17 may include a service list 17a, types of programming list 17b, times of listings 17c, and other criteria 17d.

Thus, there is still a need for a TV receiver that stores an electronic TV program guide according to selection criteria determined by the user, wherein the selection criteria and method of storing and updating the program information provide improved flexibility, versatility, and cost savings over known methods of receiving and storing electronic TV program guides.

SUMMARY OF THE INVENTION

The present invention provides a method and device for receiving and storing an electronic television (TV) program guide. In a satellite, cable or broadcast TV system, electronic TV program guides may be coded into the video signals received by the TV receiver. Many currently available TV receivers also allow users to program a list of "select-channels." When the receiver is in its "select-channel mode," the receiver only tunes to the channels the user stored in the list of select channels. The present invention limits the memory and processing power required to store an electronic TV program guide by only storing program guide information associated with the channels stored by the user in connection with the select-channel function of the receiver. By limiting the amount of channels that can be programmed into the select-channels list, the maximum memory that will be needed to store the TV program guide can be determined ahead of time. In receivers having a second tuner, the second tuner may be used to automatically update the stored program guide.

In one embodiment, the present invention includes a television receiver having: a tuning system capable of tuning to predetermined frequency channels and converting radio frequencies received on the predetermined frequency channels to video signals; a decoder receiving the video signals from the tuning system and decoding a database coded into the video signals; a microprocessor controlling the tuning system and the decoder; a first memory controlled by the microprocessor and storing a programmed subset of the predetermined frequency channels; a second memory controlled by the microprocessor and storing the decoded database; the microprocessor programmed to control the decoder such that the microprocessor stores in the second memory only database information associated with the programmed subset of the predetermined frequency channels stored in the first memory; and a display device coupled to a character generator and the microprocessor for displaying the database information on a screen of the display device.

In the above-described embodiment, the microprocessor makes the database information available for display on the screen according to the following protocol. If the tuning system is tuned to one of the predetermined frequency channels that is not among the programmed subset of the predetermined frequency channels, the database information associated with the one of the predetermined frequency channels is captured and made available for display on the screen but not stored in the second memory. If the tuning system is tuned to one of the programmed subset of the predetermined frequency channels, the microprocessor determines whether the database information associated with the one of the programmed subset channels and stored in the second memory is current. If the database information associated with the one of the programmed subset channels and stored in the second memory is current, the database information associated with the one of the programmed subset channels and stored in the second memory is read from the second memory and made available for display on the screen. If the database information associated with the one of the programmed subset channels and stored in the second memory is not current, the database information associated with the one of the programmed subset channels is captured and stored to the second memory, and the database information associated with the one of the programmed subset channels and stored in the second memory is read from the second memory and made available for display on the screen.

In a further embodiment, the tuning system comprises a first and second tuner, and the microprocessor automatically updates the database information in the second memory according to the following protocol. Tune the second tuner to one of the programmed subset of the predetermined frequency channels, capture the database information associated with the one of the programmed subset channels, and store the captured database information to the second memory.

In a method of the present invention, there is provided a method of storing database information in a television receiver, the steps comprising: storing in a first memory a subset of the available predetermined frequency channels that a tuning system of the receiver may tune to; providing the receiver with a select-channel mode wherein the tuning system only tunes to the programmed subset of the predetermined frequency channels stored in the first memory;

decoding database information from video signals received by the tuning system on the predetermined frequency channels; and storing in a second memory only information from the database associated with the programmed subset of the predetermined frequency channels stored in the first memory.

Preferably, in the above-described method, the database information is made available for display on a screen of a display device according to the following protocol. If the tuning system is tuned to one of the predetermined frequency channels that is not among the programmed subset of the predetermined frequency channels, the database information associated with the one of the predetermined frequency channels is captured and made available for display on the screen but not stored in the second memory. If the tuning system is tuned to one of the programmed subset of the predetermined frequency channels, the microprocessor determines whether the database information associated with the one of the programmed subset channels and stored in the second memory is current. If the database information associated with the one of the programmed subset channels and stored in the second memory is current, the database information associated with the one of the programmed subset channels and stored in the second memory is read from the second memory and made available for display on the screen. If the database information associated with the one of the programmed subset channels and stored in the second memory is not current, the database information associated with the one of the programmed subset channels is captured and stored to the second memory, and the database information associated with the one of the programmed subset channels and stored in the second memory is read from the second memory and made available for display on the screen.

In another aspect of the above-described method, the tuning system comprises a first and second tuner, and the database information in the second memory is automatically updated according to the following protocol. Tune the second tuner to one of the programmed subset of the predetermined frequency channels, capture the database information associated with the one of the programmed subset channels, and store the captured database information to the second memory.

The invention itself, together with further objects and attendant advantages, will best be understood by reference to the following detailed description, taken in conjunction with the accompanying drawings.

DETAILED DESCRIPTION OF THE DRAWINGS

Figure 1:
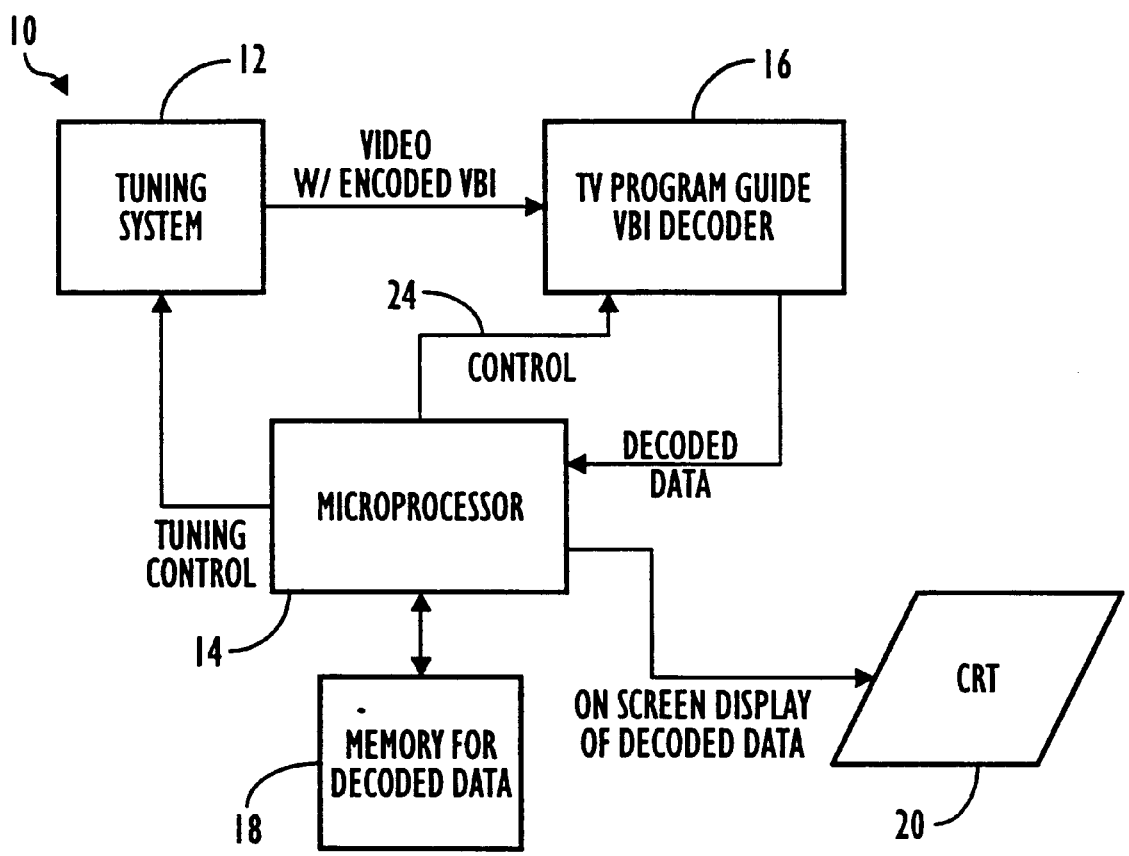
FIG. 1 is a block diagram of an electronic TV program guide controller embodying the present invention.

FIG. 1 is a block diagram of an electronic TV program guide controller 10 embodying the present invention. As shown, the controller 10 generally includes a tuning system 12 coupled to a microprocessor 14 and a decoder 16. The microprocessor 14 includes memory space 18 for storing decoded data. The microprocessor 14 further includes an internal VRAM memory (not shown) and character generator (also not shown) for supplying on-screen displays to a display device 20. Preferably, the display device 20 is a cathode ray tube (CRT), but it may also be any other type of known display device such as a liquid crystal display (LCD).

In general, the tuning system 12 is a conventional tuning system of the type available in standard TV receivers. The tuning system 12 may be provided with two separate tuners (not shown), wherein the second tuner provides picture-in-picture (PIP) functions in a known manner. The tuning system 12 converts RF signals to video and audio by tuning to selected frequencies (also know as channels or stations).

Typically, the electronic TV program guide information is encoded according to a predetermined format, then broadcast in some portion of the video/audio broadcast. In one approach, the program data is encoded in the vertical blanking interval (VBI) of one or more stations. Thus, the decoder 16 may be a VBI decoder that decodes TV program data from the VBI of one or more channels. Preferably, a control line 24 from the microprocessor 14 informs the decoder 16 of the data's format and the channel or channels on which data can be found.

The actual program information contained in a particular electronic TV program guide varies depending on the entity providing the database. For example, the database provider may include in the database program title, start time, duration, network, local affiliate, synopsis, program type (i.e., situation comedy, talk, movie, etc.), motion picture rating, trait bits (i.e., adult language, nudity, violence, etc.), channel number, current time (grenitch time), current date, stereo indication, separate audio program (SAP) indication, closed caption (CC) indication, commercials, coupon number (used for special purchase discounts).

The microprocessor 14 may be a standard commercially available integrated circuit, for example, one of the MC6800-family of microprocessors manufactured by Motorola, which is found in many currently manufactured TV receivers. The microprocessor 14 acts according to stored programs, either in internal memory (not shown) or external memory 18, to control most of the TV receiver's functions. The memory 18 may be standard dynamic random access memory (RAM) having parallel or serial access. According to the present invention, the microprocessor 14 also generates data for the on-screen program data display, and executes all decisions regarding program data capture, storage and display.

According to the present invention, one of the functions controlled by the microprocessor is a "select-channel" feature. An example of such a select-channel feature is sold under the tradename "Favorite Station," and is available on models CT-31SF21S, CT-31SF31S and PT-51G30 televisions sold by Matsushita Electric Corporation Of America, the assignee of the present invention. The typical select-channel feature allows the user, through a remote control unit (not shown), the microprocessor 14 (including its VRAM memory and character generator), tuning system 12, and display-device/CRT 20, to program a set of select channels (up to a fixed number, for example 15), whereby the microprocessor 14 controls the tuning system 12 to skip over non-programmed channels in response to a channel-change request, and only stop on the select channels. Thus, when the TV receiver is in its select-channel mode, channel change requests automatically move through the listed and stored channels, thereby saving users considerable time by not stopping on channels that are never watched.

Figure 2:
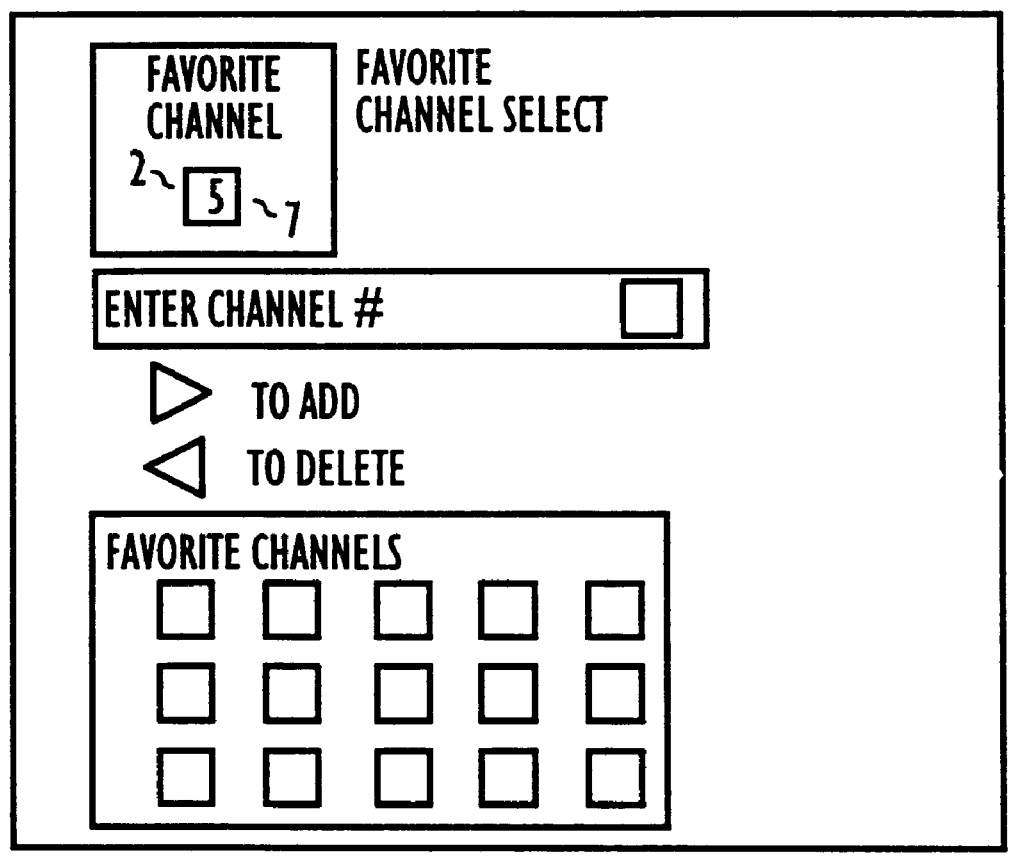
FIG. 2 illustrates an example of an on-screen display that would appear on the display device of FIG. 1 when the user is programming channels into the select-channel list.

The microprocessor 14, via its VRAM and character generator, generates an on-screen display on the display/ CRT 20 which makes programming the desired stations relatively easy. An example of such a display is shown in FIG. 2 in connection with the Matsushita "Favorite Station" feature. The user presses the appropriate buttons to display the channel selection screen shown in FIG. 2, enters a channel number, then presses left or right arrow keys on the remote or the settop to add the channel to the select-channel list or delete the channel from the select-channel list. The box at the bottom of the screen shows the complete content of the select-channel list. The Matsushita models CT-31SF21S, CT-31SF31S and PT-51G30 televisions also provide an "Auto Channel Program" mode in which the first fifteen channels selected while the TV receiver is in this mode are automatically loaded into the select-channel list. This makes programming the select-channel list even easier.

A key feature of the present invention is the use of the select-channel features, which are already present in commercially available TV receivers, to control the storage of electronic TV program guide information. The stored TV program guide information is limited to the channels that the consumer had already stored when setting up the select-channel feature. This requires considerably less memory and processing power than storing all of the available program data for all of the available channels.

Figure 3:
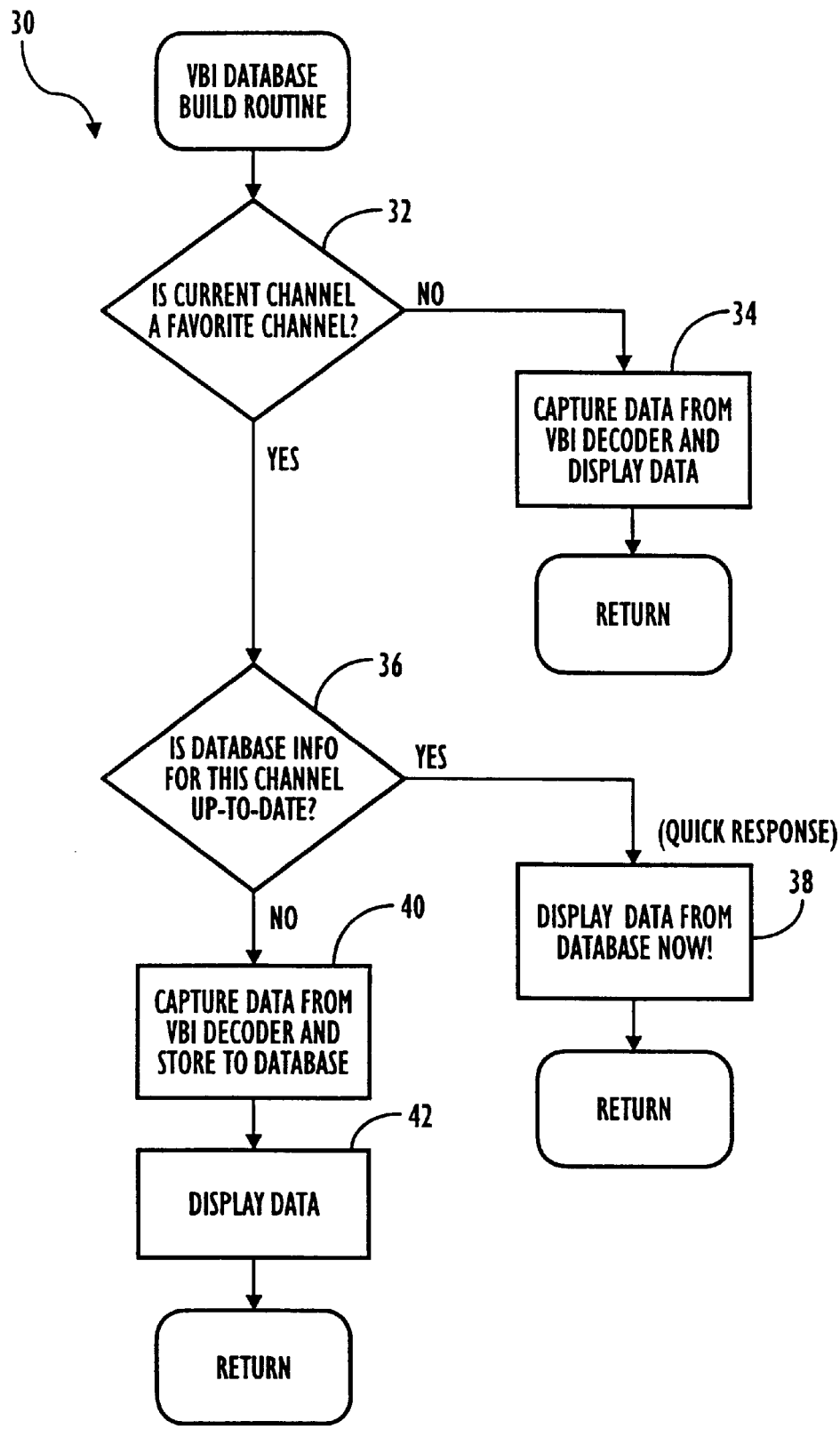
FIG. 3 is a flow diagram of a program for storing an electronic TV program guide using the controller shown in FIG. 1. The program shown in FIG. 3 may be implemented on a single tuner system.

FIG. 3 is a flow diagram of a program 30 for automatically updating the electronic TV program guide according to the select-channel list previously programmed and stored in connection with a select-channel feature. The program 30 may be implemented on the microprocessor 14 of the controller 10 shown in FIG. 1 using a single-tuner tuning system 12. The program 30 begins at block 32 by determining whether the current channel is one of the select channels. As previously noted, the microprocessor 14 has a database of user-selected channels (up to 15 for the Matsushita "Favorite Station" feature). When the microprocessor 14 processes a command to access one of these channels, either by direct channel number entry, or by normal channel scan, or by select-channel scan, the microprocessor 14 compares the requested channel with the previously programmed and stored select-channel list.

If the current channel is not on the stored select-channel list, the program 30 moves to block 34 where the microprocessor 14 captures data from the decoder 16 and passes it to the VRAM of a character generator (not shown) preferably located in the microprocessor 14. Thus, for current channels that are not on the select-channel list, the TV program guide data is made available for immediate on-screen display, but is not stored in the database in memory 18. From block 34, the program 30 is returned to its beginning.

If the current channel examined in block 32 is on the select-channel list, the program 30 moves to block 36 and determines whether the stored database information associated with the subject channel is current. The microprocessor 14 determines whether the database information is current by comparing the stored program start time and duration with the TV receiver's current real time clock. If the calculated program end time is earlier than the real time clock, the stored database information is not current. Also, after having watched a select channel for a period of time, the incoming database for that select channel will be decoded and compared with the database stored in memory 18. If some aspect of the database information has changed, the stored database information is updated, and an indication is automatically provided to the viewer, either by momentarily displaying the new data on the display screen, or by flashing a small icon on the display screen.

If the stored database information associated with the subject channel is current, in block 38, the microprocessor 14 copies the stored database for the subject channel from the memory 18 to the VRAM of the character generator (not shown) in the microprocessor 14. This eliminates the inherent delay that results from piecing together (byte by byte) the text as it is received field by field or frame by frame in the VBI. The stored database for the subject channel is then displayed on the CRT 20.

If the answer to the inquiry in block 36 is no, the program 30 moves to block 40 and captures TV program guide data from the decoder 16 to store to the database in memory 18. If in block 36 it is determined that the stored data is not current, the microprocessor 14 clears the old data from the memory 18. The microprocessor 14 then starts the process of accepting TV program guide data from the decoder 16 and storing it in the memory 18. Preferably, the program 30 includes one of the many known memory management techniques to manage data storage in the memory 18. In block 40, the microprocessor 14 copies the stored database for the subject channel from the memory 18 to the VRAM of the character generator (not shown) in the microprocessor 14. The stored database for the subject channel is then displayed on the CRT 20.

Figure 4:
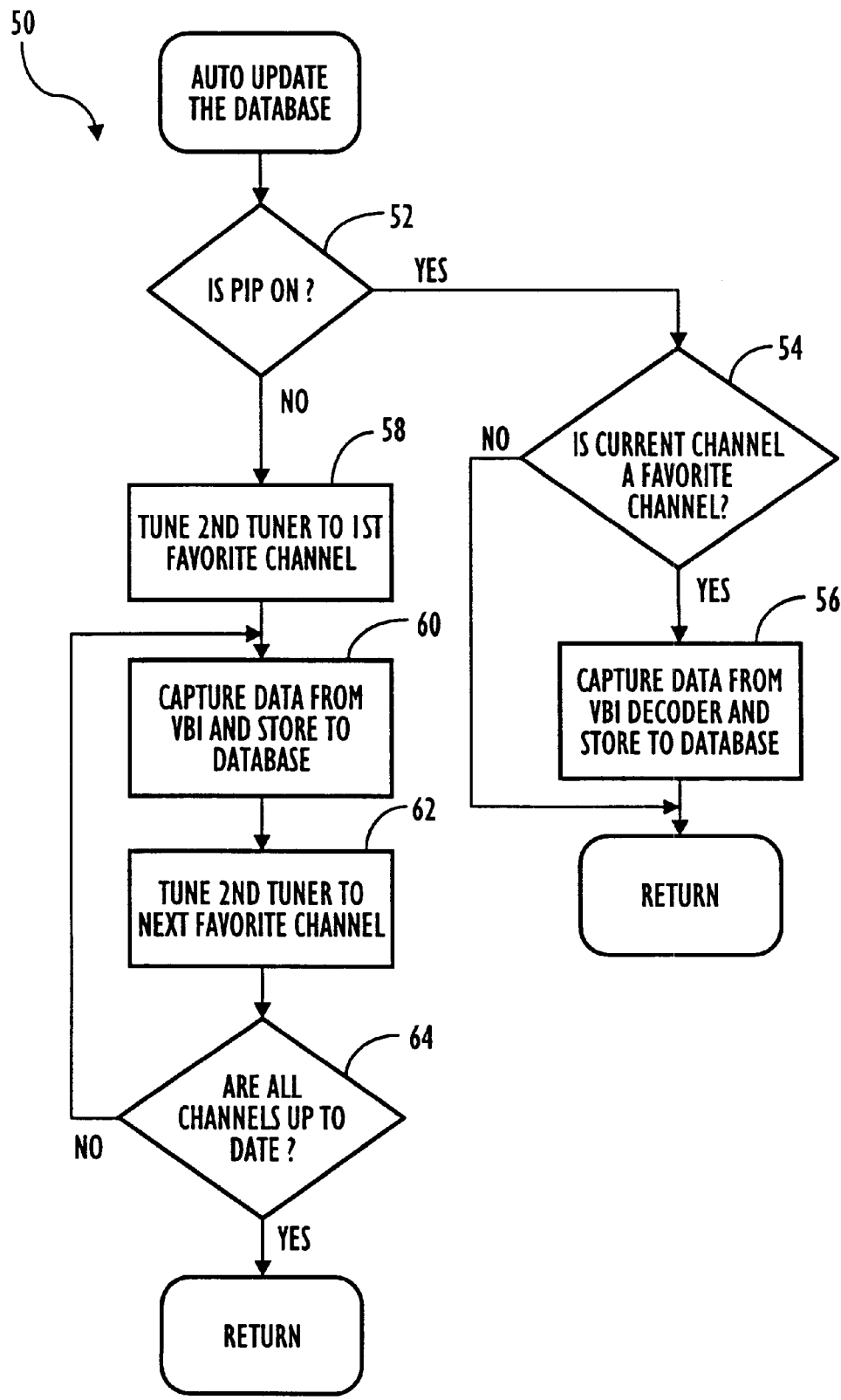
FIG. 4 is another flow diagram of a program for storing an electronic TV program guide using the controller shown in FIG. 1. The program shown in FIG. 4 may be implemented on a multi-tuner system.

FIG. 4 is another flow diagram of a program 50 for storing an electronic TV program guide using the controller 10 shown in FIG. 1. The program 50 shown in FIG. 4 may be implemented on a multi-tuner tuning system 12, for example, a tuning system having "picture-in-picture" (PIP) features supplied by a second tuner. In block 52, the program 50 determines whether the PIP feature is on. If the answer to this inquiry is yes, the program 50 moves to block 54 where the microprocessor 14 checks the tuned channel of the second tuner against the select-channel list stored in memory 18. If the answer to the inquiry in block 54 is yes, the program 50 moves to block 56 where the microprocessor 14 captures data from the decoder 16 and stores it in the TV program guide database in memory 18. Again, there is preferably one of the conventional memory management used here to insure no wasted memory space. If the current channel is not one of the select channels stored in memory 18, the program 50 moves from block 54 to the beginning of the program.

If the answer to the inquiry in block 52 is no, the PIP second tuner of the tuning system 12 is used to sequence through the stored list of select channels to thereby update the TV program guide information in the database stored in memory 18. In block 58, the microprocessor 14 tunes the PIP tuner to a first channel in the stored select-channel list, or to a first channel in the stored select-channel list that is not up to date. In block 60, the microprocessor 14 clears the old data from the TV program guide database in memory 18. The microprocessor 14 then starts the process of accepting TV program guide data from the decoder 16 and storing it in the database in memory 18.

In block 62, the microprocessor 14 tunes the PIP tuner to the next channel in the select-channel list. In block 64, if all of the select channels are up to date, the program 50 returns to its beginning. If in block 64, all of the select channels are not up to date, the program 50 returns to block 60 where the microprocessor 14 clears the old data from the TV program guide database in memory 18, then starts again the process of accepting TV program guide data from the decoder 16 and storing it in the database in memory 18.

Thus, the present invention provides several advantages. The memory and processor requirements of the present invention are reduced by limiting stored TV program data to the channels previously stored by the user in connection with using the select-channel features found on many currently available TV sets. Thus, the two features may be activated simultaneously by configuring the select-channel list. Updating is made significantly more efficient by using the second (PIP) tuner found in many currently available TV sets to update the TV program database.

Of course, it should be understood that a wide range of changes and modifications can be made to the preferred embodiment described above. It is therefore intended that the foregoing detailed description be regarded as illustrative rather than limiting and that it be understood that it is the following claims, including all equivalents, which are intended to define the scope of this invention.

What is claimed is:

1. A video signal receiving device comprising:
    a tuning system capable of tuning to predetermined frequency channels and converting radio frequency signals received on said predetermined frequency channels into video signals;
    a decoder for receiving said video signals from said tuning system, said video signals comprising a program guide;
    a microprocessor for controlling said tuning system and said decoder; and
    a memory coupled to said microprocessor, said memory operative for storing a programmed subset of said predetermined frequency channels and a portion of said program guide, said portion of said program guide being related to said programmed subset of said predetermined frequency channels;
    wherein said microprocessor is programmed to repeatedly compare said portion of said program guide stored in said memory with a corresponding portion of said program guide contained in said video signals and received subsequent to storing of said portion of said program guide in said memory.

2. A video signal receiving device according to claim 1, wherein said microprocessor updates said portion of said program guide stored in memory when new information is contained in said corresponding portion of said program guide contained in said video signals.

3. A video signal receiving device according to claim 1, further comprising a display device.

4. A video signal receiving device according to claim 3, wherein said microprocessor makes said program guide available for display by said display device according to the following protocol:
    if said tuning system is tuned to one of said predetermined frequency channels that is not among said programmed subset of said predetermined frequency channels, the program guide associated with said one of said predetermined frequency channels is obtained from said video signals and made available for display, but is not stored in memory;
    if said tuning system is tuned to one of said programmed subset of said predetermined frequency channels, said microprocessor determines whether said portion of said program guide stored in said memory and associated with the selected frequency channel is current,
    if said portion of said program guide associated with the selected frequency channel is current, the program guide associated with the selected frequency channel is read from said memory and displayed on said display device, and
    if said portion of said program guide associated with the selected frequency channel is not current, the program guide associated with the selected frequency channel is obtained from said video signals and made available for display, and stored in said memory.

5. A video signal receiving device according to claim 1, wherein said program guide is contained in the vertical blanking interval of said video signals.

6. A video signal receiving device according to claim 1, wherein said program guide is contained in a video portion or an audio portion of said video signals.

7. A video signal receiving device according to claim 1, wherein said tuning system comprises a tuner, and said microprocessor automatically updates said portion of said program guide stored in said memory according to the following protocol:
    sequentially tuning said tuner to each one of said programmed subset of said predetermined frequency channels;
    determining whether the program guide associated with any of said programmed subset of said predetermined frequency channels is not current;
    capturing program guide information for those programmed subset of said predetermined frequency channels that are not current from the video signals; and
    storing said captured program guide information in said memory.

8. A method of generating a program guide in a video signal receiving device, said method comprising of the steps:
    tuning to predetermined frequency channels and converting radio frequency signals received on the predetermined frequency channels to video signals, said video signals comprising said program guide;
    decoding said video signals so as to extract said program guide;
    storing a programmed subset of said predetermined frequency channels and a portion of said program guide in memory, said portion of said program guide being related to said programmed subset of said predetermined frequency channels; and
    repeatedly comparing said portion of said program guide stored in said memory with a corresponding portion of said program guide contained in said video signals and received subsequent to storing of said portion of said program guide in said memory.

9. A method of generating a program guide in a video signal according to claim 8, further comprising the step of updating said portion of said program guide stored in memory when new information is contained in said corresponding portion of said program guide contained in said video signals.

10. A method of generating a program guide in a video signal according to claim 8, further comprising the step of displaying said program guide.

11. A method of generating a program guide in a video signal according to claim 10, further comprising making said program guide available for display by said display device according to the following steps:
    if said tuning device is tuned to one of said predetermined frequency channels that is not among said programmed subset of said predetermined frequency channels, the program guide associated with said one of said predetermined frequency channels is obtained from said video signals and made available for display, but is not stored in memory;

if said tuning device is tuned to one of said programmed subset of said predetermined frequency channels, determining whether said portion of said program guide stored in said memory and associated with the selected frequency channel is current, if said portion of said program guide associated with the selected frequency channel is current, the program guide associated with the selected frequency channel is read from said memory and displayed on said display device, and if said portion of said program guide associated with the selected frequency channel is not current, the program guide associated with the selected frequency channel is obtained from said video signals and made available for display, and stored in said memory.

12. A method of generating a program guide in a video signal according to claim 8, wherein said program guide is contained in the vertical blanking interval of said video signals.

13. A method of generating a program guide in a video signal according to claim 8, wherein said program guide is contained in a video portion or an audio portion of said video signals.

14. A method of generating a program guide in a video signal receiving device according to claim 8, wherein said program guide stored in memory is automatically updated according to the following steps:

sequentially tuning to each one of said programmed subset of said predetermined frequency channels;

determining whether the program guide associated with any of said programmed subset of said predetermined frequency channels is not current;

capturing the program guide for those programmed subset of said predetermined frequency channels that are not current from the video signals; and storing said captured program guide information in said memory.

15. A method of generating a program guide, said method comprising the steps of:

defining a plurality of favorite channels, and storing a list of said favorite channels in memory;

generating a database for storing program guide information associated with each of said favorite channels;

selecting a channel for viewing;

determining if said selected channel is one of said favorite channels;

if said selected channel is one of said favorite channels and said program information associated with said selected favorite channel is current, said program information associated with said selected favorite channel is displayed, if said selected channel is one of said favorite channels and said program information associated with said selected favorite channel is not current, said program information associated with said selected favorite channel is updated and then displayed.

16. A method of generating a program guide according to claim 15, wherein said program information associated with said favorite channel is updated by decoding a video signal corresponding to said favorite channel, said video signals comprising said program guide information associated with said favorite channel, and storing said program guide information associated with said favorite channel in said database.

17. A method of generating a program guide according to claim 15, wherein if said selected channel is not one of said favorite channels, program guide information associated with said selected channel is obtained by decoding a video signal comprising said program guide information and displaying said program guide information, said program guide information associated with said selected channel not being stored in memory.

18. A method of generating a program guide according to claim 15, wherein said program guide information is contained in the vertical blanking interval of said video signals.

19. A method of generating a program guide according to claim 15, wherein said program guide is contained in a video portion or an audio portion of said video signals.

20. A computer program stored onto a recordable medium for execution in a computer system for automatically controlling presentations of an electronic program guide for at least one user viewing video delivered to a computer display, said program comprising the steps of:

generating a database comprising data representing said electronic program guide and representing said user's favorite video channels;

determining if a currently selected channel is one of the favorite channels identified in said database;

capturing data from a video decoder if said selected channel is not a favorite channel, said data representing the program guide associated with said selected channel, making said data available for display;

if said selected channel is one of said favorite channels and said program guide information associated with said selected channel is current, said program information associated with said favorite channel is displayed, and if said selected channel is one of said favorite channels and said program information associated with said selected channel is not current, said program information associated with said favorite channel is captured from said video decoder, stored in said database and displayed.

* * * * *